J. W. BARBER.
COUPLING OR CLUTCH.
APPLICATION FILED DEC. 2, 1912.

1,214,985.

Patented Feb. 6, 1917.
5 SHEETS—SHEET 1.

Witnesses:
Lewis Hodges
E Batchelder

Inventor:
J. W. Barber
by Wright Brown Quinby May
Attorneys.

J. W. BARBER.
COUPLING OR CLUTCH.
APPLICATION FILED DEC. 2, 1912.

1,214,985.

Patented Feb. 6, 1917.
5 SHEETS—SHEET 2.

Witnesses:
Lewis Hodges
E. Batchelder

Inventor:
J. W. Barber
by Wright Brown Quinby Muy
Attorneys.

J. W. BARBER.
COUPLING OR CLUTCH.
APPLICATION FILED DEC. 2, 1912.

1,214,985.

Patented Feb. 6, 1917.
5 SHEETS—SHEET 4.

Witnesses:
Lewis Hodges
E Batchelder

Inventor:
J. W. Barber
Wright Brown Quimby May
Attorneys.

UNITED STATES PATENT OFFICE.

JOHN WESLEY BARBER, OF NEWTON, MASSACHUSETTS.

COUPLING OR CLUTCH.

1,214,985.         Specification of Letters Patent.         Patented Feb. 6, 1917.

Application filed December 2, 1912. Serial No. 734,491.

*To all whom it may concern:*

Be it known that I, JOHN WESLEY BARBER, a citizen of the United States, and a resident of Newton, in the county of Middlesex and State of Massachusetts, have invented certain new and useful Improvements in Couplings or Clutches, for portions of which I have taken out Letters Patent in Switzerland, No. 67,856, December 30, 1911, of which the following is a specification.

This invention relates to couplings of the type which is adapted to grip pipes or other bodies by friction or rotative clamping pressure, without the aid of screw threads, the connection being effected by means of eccentric cylindrical surfaces.

One of the objects of the present invention is to provide a coupling of this type so constructed that relative rotation of the parts of the coupling in either direction will draw said parts together and positively hold them in coupled condition so that they cannot be separated in the direction of their length.

Another object of the invention is to provide improved means for connecting flexible pipes, such as hose, to the end members of the coupling.

Further objects are to provide improvements which I shall now proceed to describe and claim.

Figs. 9 to 18 inclusive illustrate one embodiment of the invention, and so far as the eccentric and cam-faced features of construction are concerned are substantially the same as the embodiments illustrated in the preceding figures, but omitting pipes or rods, as here the clamping and drawing together is of the pipe or coupling members themselves;

Similar reference characters indicate the same parts in all the figures, reference letters being used in the later figures in connection with reference numerals where the parts perform the same functions but are slightly different in construction.

Figure 1:
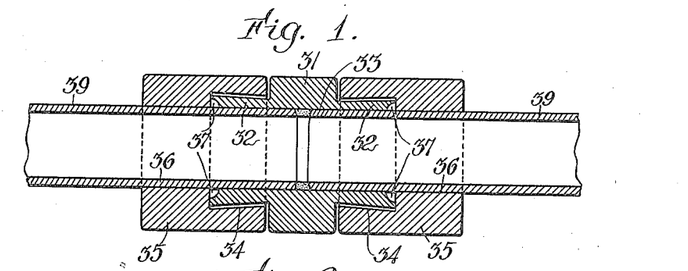
Figure 1 represents a longitudinal section through one form or embodiment of my improved coupling.

Referring first to Fig. 1, the coupling primarily comprises three members, a central one 31 and two end members 35. The external surfaces of the three members may be circular or externally polygonal to provide wrench-engaging surfaces. All three members are internally cylindrical.

The central member 31 is reduced at each end to form an extension 32 which, for convenience of designation, will be referred to herein as a sleeve. The outer surface of each sleeve 32 is cylindrical but is eccentric to the longitudinal center or axis of the inner cylindrical surface or bore 33 of the member 31. As said opening receives the abutting ends of two pipes or cylindrical bodies 39, it may be termed the socket of the central member.

Figures 3, 4, 5, 6:
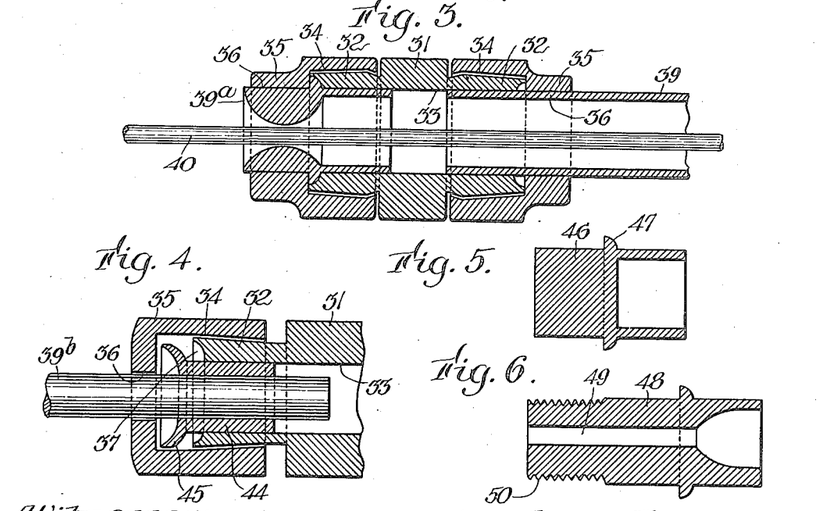
Fig. 4 is a longitudinal section illustrating another feature of my improvements.
Figs. 5 and 6 are detail sectional views illustrating additional members which may be employed with my improved coupling.

The outer end of each sleeve 32 is formed with an undercut recess 37 to receive packing or the flanges of other members, such as shown in Figs. 5 and 6.

Each end member 35 is formed with a recess, the inner surface 34 of which is eccentric to the longitudinal center of said end member and to the cylindrical pipe-engaging surface 36 of said member, so that, after the parts are slipped together endwise rotation of the end members upon the sleeves 32 will cause the surfaces 36 to grip firmly the pipes or cylindrical bodies and hold them tightly coupled without the use of screw threads. The construction as so far described is old and well known. My improvements consist in so constructing the interengaging members that the relative rotation of said members in either direction will draw them together and tightly hold them in coupled condition. For this purpose I form the eccentric interengaging surfaces so that they will act as cams which will not only draw the parts together but will absolutely prevent them from being separable in the direction of their length.

In Fig. 1 the sleeves 32 are flaring so as to be larger at their extreme ends than at other portions where they join the middle portion or body of the member 31, while the eccentric recesses 34 are tapered or contracted from their bottoms toward their open ends so that when the sleeve 32 is inserted in a recess 34 and relatively rotated, the longitudinally inclined surfaces will draw and hold the parts in the relative positions shown in Fig. 1.

Figure 2:
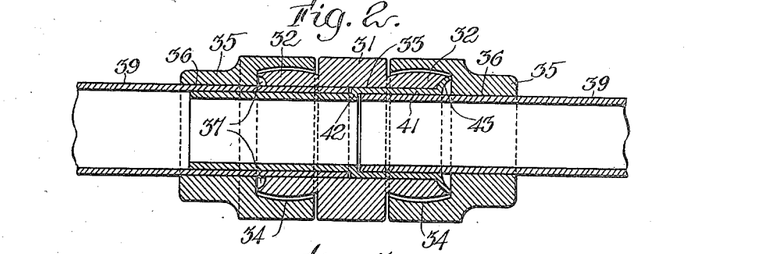
Figs. 2 and 3 are similar views illustrating other embodiments of the invention.

In Fig. 2 the construction of the coupling is substantially the same as in Fig. 1, but in this case the eccentric surfaces of the sleeves 32, instead of being cone-shaped as shown in Fig. 1, are rounded or somewhat barrel-shaped longitudinally, and the recesses 34 are similarly formed. This structure, however, of the interengaging cylindrical but eccentric surfaces results in the same operation of drawing and holding the parts together when assembled and relatively rotated.

In Fig. 2 I illustrate the coupling as coupling tubes of different diameters. For this purpose the device contains in the central part a sleeve or bushing 41 which is offset at 42 and has at one end an external flange 43 which fits the cavity in the end of one of the sleeves 32, whereby said sleeve 41 is held in position longitudinally. The larger tube 39 receives the smaller end of the sleeve or bushing, while the smaller pipe enters the larger portion of the sleeve or bushing, the offset 42 providing shoulders for the ends of the two pipes. Of course packing can be employed in the recess formed in the outer end or face of the flange 43.

In Fig. 3 the formation of the interengaging cylindrical but eccentric surfaces is slightly different from that shown in Fig. 1 or in Fig. 2, in that said surfaces are longitudinally shaped to present co-acting faces which in section resemble two cones meeting at their bases. The action, however, to draw and hold the members together is the same as in the other figures. In said Fig. 3 the members of the coupling are employed to hold a pipe 39 at one end and at the other end to hold a bushing $39^a$ having a contracted opening, the walls of which are curved from end to end so that a wire or rod passing through said bushing $39^a$ and subjected to flexure may not be sharply bent. Said bushing $39^a$ has an external flange or shoulder which fits an undercut recess to prevent longitudinal movement of said bushing. This device is particularly suitable for aeroplanes where, for instance, the steering apparatus is actuated through tension wires such as the wire indicated at 40.

The structure shown in Fig. 4 is especially designed for clamping a rod of relatively small diameter, such as a spoke or stay. In this construction a bushing 44, which closely fits the rod $39^b$ externally, internally fits the sleeve 32, and has a flange or shoulder 45 to prevent longitudinal movement. With such an arrangement the cylindrical rod-engaging surface 36 of the end member 35 is caused to bind on the rod $39^b$ when said member 35 is rotated so that its eccentric cam-faced interengaging surfaces cause a lateral movement of the member 35 relatively to the member 31, which latter acts through the bushing 44 to hold the rod.

In Fig. 5 I show a device which may be used to close tightly the end of a pipe. In other words the coupling may be caused to connect or couple such a plug as shown in Fig. 5 with a pipe 39. In said Fig. 5 the plug comprises a solid cylindrical body 46 having a flange or shoulder 47 adapted to engage the undercut recess 37 shown in Fig. 1. By substituting the plug 46 for the pipe 39 shown at the left in Fig. 1, the device serves to close tightly or plug the conduit formed by the right hand pipe 39.

In Fig. 6 I show a member which may be connected up in the same manner as described in connection with Fig. 5. The member shown in Fig. 6 comprises a nipple having a cylindrical body 48 having an external shoulder or flange to fit a recess 37, said nipple having a longitudinal passage 49, the end of the nipple being externally threaded as at 50. With the nipple coupled in place of the left hand pipe 39 shown in Fig. 1, provision is made for connecting to it any threaded pipe. This device is useful where it is desirable to abruptly reduce the transverse area of a conduit.

Figures 7, 8:
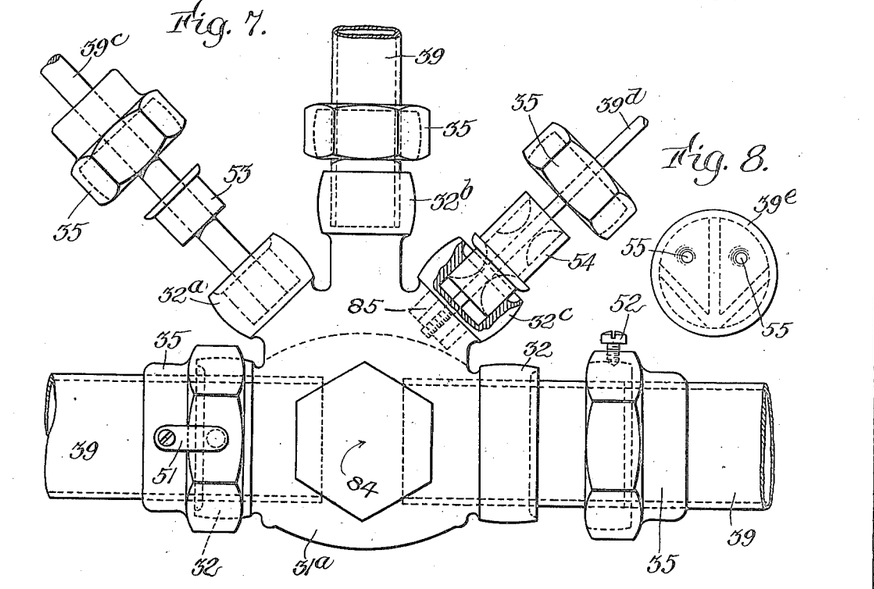
Fig. 7 represents different embodiments of my invention connecting several pipes or rods or wires in truss form.
Fig. 8 is an end view of a partition pipe or conduit which may be gripped or clamped by my improved coupling.
Figure 9:
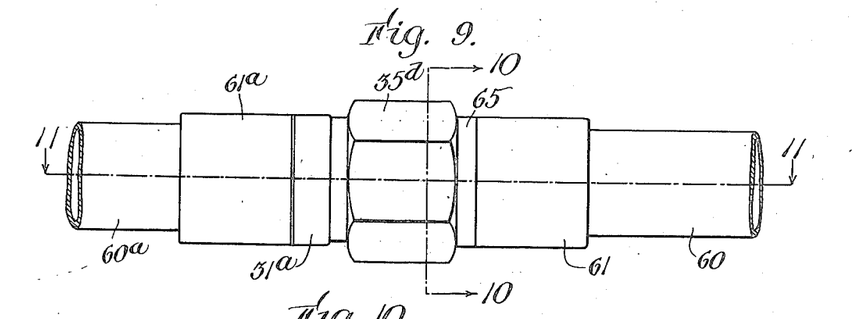
Fig. 9 is a plan view of another modification of the coupling shown in Fig. 2.
Figure 10:
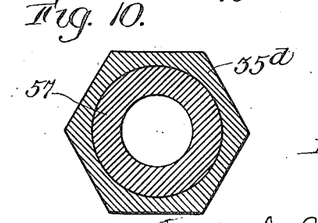
Fig. 10 represents a section on line 10—10 of Fig. 9 wherein two flexible pipes are connected and the coupling acts upon the pipe or coupling members, no tube or inside rod being needed.

In Fig. 7 I illustrate several embodiments of the invention in connection with a single main central member. In said figure the central member 31$^a$ couples to pipes 39 by means of end members 35 of the form illustrated in Fig. 2, said Fig. 7 showing one of the end members 35 in clamping position while the other is slid outwardly from the sleeve 32. A suitable removable cap or plug 84 enables access to be had to the interior of the central member 31$^a$, so that the nut 85, indicated by dotted lines, can be reached to connect it to or disconnect it from the small rod or wire 39$^d$ presently referred to. When such a truss structure as indicated in Fig. 7 is employed, each truss structure is subjected to continual strain or vibration. It is desirable sometimes to provide additional means for preventing any starting of an end member 35 away from its clamping position. To this end I may provide a detent comprising a spring 51 secured at one end to the member 35 and having at its other end a plug passing through said member 35 snapped into and engaging the sleeve 32 within said member 35. Or such detent may comprise a screw such as indicated at 52. In either case the inner end of the plug or the inner end of the screw will enter a depression formed in the surface of the sleeve 32.

Fig. 7 represents the central member 31$^a$ as having three additional extensions or sleeves 32$^a$, 32$^b$, 32$^c$. Coupled to the sleeve 32$^a$ by means of an end member 35 and by a bushing 53 is a rod 39$^c$. Secured to the sleeve 32$^b$ by means of a coupling member 35 is a tube 39 of smaller diameter than the other two pipes which are in alinement in the body or central member 31$^a$. The sleeve 32$^c$ has coupled to it by means of a clamping member 35 and an intermediate bushing 54, a small rod or wire 39$^d$. The bushing 54 is formed internally with rounded supporting surfaces for the wire 39$^d$, similar to the bushing shown in Fig. 3. The parts shown in Fig. 7 may properly be considered as parts of a truss structure the members of which radiate from the central member 31$^a$. I therefore do not limit myself to making any of the radiating members tubular, since they may be solid rods or wires.

It is sometimes desirable that the tubes or conduits coupled by means of my improved coupling shall be longitudinally divided. In Fig. 8 I show a pipe 39$^e$ as having longitudinal partitions represented by dotted lines, the end of the pipe being closed and formed with holes 55 through which wires can be passed into the conduit.

Referring again to the structure illustrated in either Figs. 1, 2 or 3, it is to be understood that either end member 35 might be omitted or left permanently connected, the remaining member 35 constituting a female member with which the member 31 and its sleeve 32 will coöperate as a male member. Such a structure as just referred to is embodied in the device illustrated in Figs. 9 to 18 inclusive, to which reference may now be had.

Figure 11:
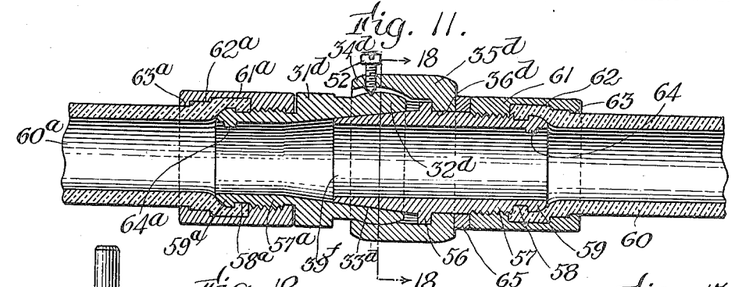
Fig. 11 represents a section on line 11—11 of Fig. 9.
Figures 12, 13, 14, 15, 16, 17, 18:
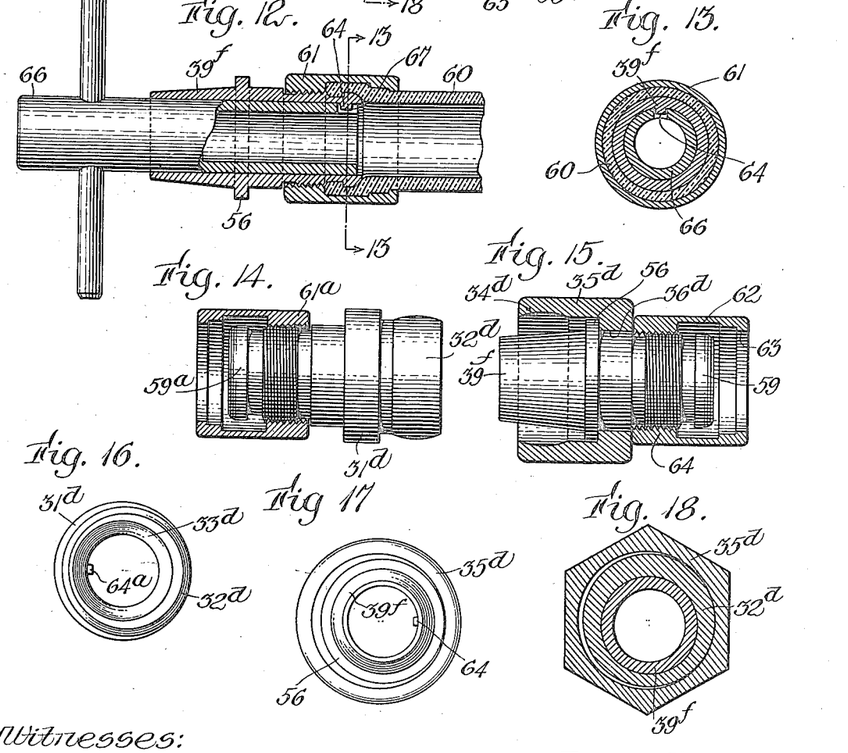
Fig. 12 is a sectional view similar to a portion of Fig. 11, but illustrating the use of a key or wrench for assembling a member of the coupling with a flexible pipe or hose.
Fig. 13 represents a section on line 13—13 of Fig. 12.
Figs. 14 and 15 are side elevations, partly in section, of the pipe members of the coupling shown in Fig. 11 separated from each other.
Fig. 16 represents an end elevation from the right of Fig. 14.
Fig. 17 represents an elevation from the left of Fig. 15.
Fig. 18 represents a section on line 18—18 of Fig. 11.

As best shown in Figs. 11 and 14, the male member 31$^d$, 32$^d$ is the equivalent of the member 31 and its right-hand sleeve 32 in Fig. 2, one difference however being that the interior of the portion 32$^d$ is tapered as at 33$^d$ for a purpose presently described. As shown in Figs. 11 and 15, the female member 35$^d$ has an eccentric and cam-shaped surface 34$^d$ which coöperates with the portion 32$^d$ of the male member in clamping and drawing the parts together by a relative rotary motion. The said member 35$^d$ has an inner cylindrical surface 36$^d$ which receives a cylindrical portion of the tubular section 39$^f$, the latter being tapered at one end to enter and co-act with the tapered inner surface 33$^d$ of the male member to form a joint of the type known as a "ground joint." The tapered tubular section 39$^f$ has a rib or flange 56, a threaded portion 57, an annular groove 58, and a tapered rib 59 at its extreme outer end.

Figs. 14 and 15 show the male and female members separated. When they are assembled the tapered end of the section 39$^f$ passes into the end of the male member, while the member 35$^d$ passes over the portion 32$^d$, after which, by rotation of one member relatively to the other, the parts are drawn and clamped together in the same manner as described in connection with Figs. 1, 2 and 3.

Referring to Figs. 12 and 13 and the right-hand portion of Fig. 11, it will be seen that a conduit such as a hose 60 is tightly secured to the tubular section 39$^f$. This is effected by means of a sleeve 61 having an internal annular recess 62 and an internal rib 63. The end of the tubular section 39$^f$ is formed or provided with a small inwardly projecting lug 64.

Since the member 35$^d$ is rotatable on the inner tubular section 39$^f$, it is desirable to provide some means whereby the section 39$^f$ can be held, or can be rotated, to enable the sleeve 61 to be screwed home. Hence the provision of the lug 64, which is adapted to be engaged by a notch 67 formed in the end of a key or wrench 66 (Fig. 12). In Fig. 12 the member 35$^d$ is omitted, but in practice it occupies the position shown in Fig. 11 when the hose 60 is being connected to the section 39$^f$. When the hose 60 is to be connected, the key or wrench is inserted as shown in Fig. 12, the sleeve 61 having been previously slipped over the end of the hose 60. By then turning the key or wrench so as to rotate the section 39$^f$, the screw threads 57 of the latter, engaging the internal threads of the sleeve 61, cause the section 39$^f$ to be forced inwardly, its tapered rib 59 spreading the end of the hose and forcing it into the internal annular recess 62 of said sleeve. This structure will enable the coupling to be connected either to a rubber hose, or a lead pipe, or a pipe made of other metal capable of being slightly expanded.

Preferably when the parts are assembled I interpose a washer 65 between the member 35$^d$ and the sleeve 61, as shown in Fig. 11, in order to steady the member 35$^d$ in its rotative movements. The washer 65, by bearing against one end of the coupling member 35$^d$, backs up the coupling member and holds it against the annular rib 56 to firmly hold or steady the said coupling member while the latter is being rotated.

At the left of Fig. 11 I show the member 31$^d$ as having a hose 60$^a$ connected to it by the same means illustrated at the right in said figure. In order that the member 31$^d$ may be held or rotated by means of the key or wrench 66, I provide the said member 31$^d$ with a small internal lug 64$^a$. At the said left of Fig. 11 the same reference characters are employed as at the right with the exception of the addition of the exponent $a$, and hence further description thereof will be unnecessary.

It will now be seen that in the structure just described, as well as in the others, I have provided a coupling having its members provided with cylindrical inner surfaces and with interengaging cylindrical surfaces which are eccentric relatively to the said inner surfaces, the interengaging surfaces being longitudinally cam-faced whereby relative rotation of the members in either direction will draw said members together and positively hold them in coupled condition. Sometimes it is desirable that there shall be means for preventing possibility of any accidental relative rotation of the members after they have been assembled. To this end—see Fig. 19—the section 39$^f$ may be provided with a notch 68 to receive a lug 69 projecting inwardly from the member 31$^d$ when the two are slipped together. This also enables the hose 60 to be connected in the same manner as described in connection with Fig. 12, and without a wrench 66, because an ordinary monkey wrench, grasping the polygonal portion of member 31$^d$, can be used to rotate both the member 31$^d$, 32$^d$ and the coupled parts 35$^d$, 39$^f$.

Figures 19, 20:
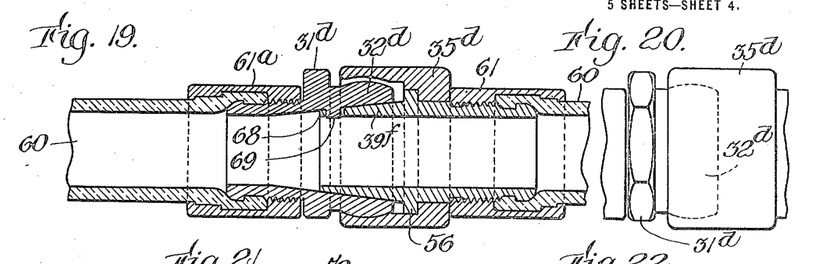
Fig. 19 is a view similar to Fig. 11, but illustrating another embodiment or modification to prevent relative rotation.
Fig. 20 is a side elevation of the members shown at the middle of Fig. 19.
Figure 21:
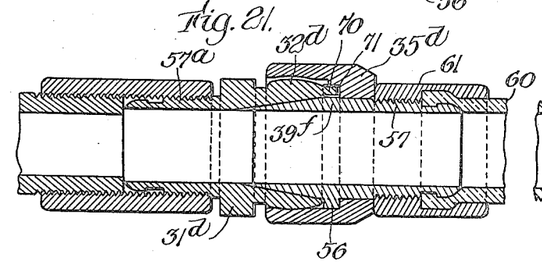
Figs. 21 and 22 are views similar to Figs. 11 and 19, and illustrating a different construction of interengaging members, also to prevent rotation of the pipe members.

In Fig. 21 another structure similar to Figs. 11 and 19 is shown, but the means for preventing relative rotation of the pipe member 39$^f$ and pipe member 31$^d$ consists of a lug 70 projecting from the portion 32$^d$ of the member 31$^d$; said lug entering a notch 71 in the rib 56 of the pipe member 39$^f$ when the parts are assembled.

Figure 22:
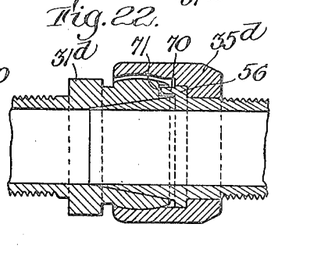

Instead of the lug 70 being carried by the portion 32$^d$, and the notch 71 being formed in the rib 56, they may be reversed, as shown in Fig. 22.

Of course it will be understood that means for preventing accidental rotation of the member 35$^d$ relatively to the member 31$^d$, 32$^d$ may be provided, such as the spring detent 51 or screw detent 52 shown in Figs. 7 and 11.

Figure 23:
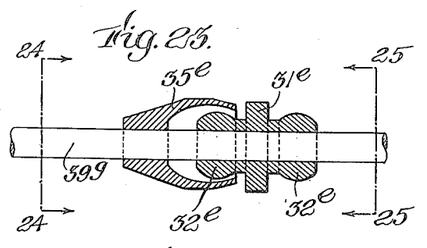
Fig. 23 is a longitudinal section of another embodiment of the invention.
Figure 24:
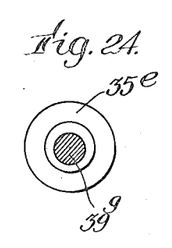
Figs. 24 and 25 represent sections on lines 24—24 and 25—25 respectively of Fig. 23.
Figure 25:
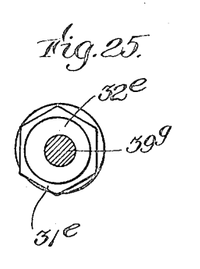

In Figs. 23, 24 and 25 I illustrate a coupling device which may be clamped anywhere upon a rod 39$^g$. In said figure the coupling or clamp consists of members 35$^e$ and 31$^e$, the latter having a sleeve or extension 32$^e$ which is longitudinally cam-faced, and is eccentric relatively to the central aperture of the member 31$^e$, so as to co-act with a longitudinally cam-faced and eccentric recess in the member 35$^e$. So far as concerns the relative forms of these members so that rotation of one relatively to the other will cause them to draw together and to bind or clamp, they are substantially the same as described in connection with the other figures of the drawings. In said Fig. 23 there are two extensions 32$^e$ and it will be readily understood that if another member 35$^e$ were used in connection with the right-hand extension 32$^e$, then the rod 39$^g$, instead of being a continuous rod, might be two rods which would be drawn and clamped together in the same manner as described in connection with the other figures of the drawings.

Figure 26:
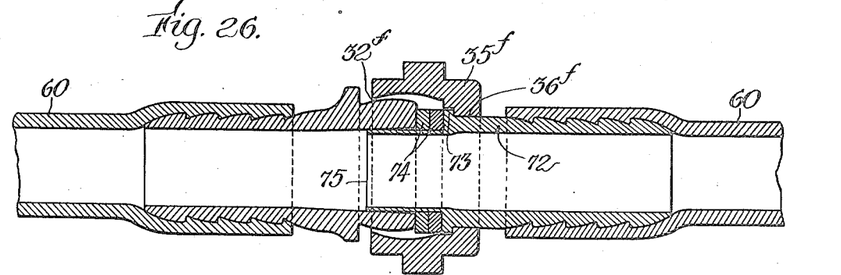
Fig. 26 is a longitudinal section representing another embodiment or modification of the invention.

In Fig. 26 I illustrate the invention as embodied in a form which employs washers instead of a "ground joint" formation to produce an absolutely tight joint, as when the device is to be used for air or water hose. In said Fig. 26 the male member 32$^f$ has an eccentric surface and is longitudinally cam-faced, as in Figs. 2, 11 and 19, and the female member 35$^f$ has an internal recess which is longitudinally cam-faced and is eccentric relatively to its cylindrical opening 36$^f$ and which receives the sleeve or hose nipple 72. Said nipple 72 is provided with an external shoulder 73 between which and the end of the member 32$^f$ are one or more washers 74, preferably of an elastic material. The air or water hose pipes are connected to the externally corrugated surface of the nipple 72 and the externally corrugated end portion of the member 32$^f$, in a manner well known. The nipple 72 is formed with a cylindrical extension 75 which projects into the member 32$^f$ in the same manner that the section 39$^f$ in Fig. 19 extends into the member 32$^d$, but not necessarily fitting closely therein. By rotating the members 32$^f$, 35$^f$ relatively to each other the parts will be so drawn together as to clamp the washers 74 tightly. It is to be understood of course that with this structure also a detent such as indicated at 51 or 52 in Fig. 7 may be employed to prevent accidental relative rotation that might permit the parts to separate. Referring to Figs. 11, 19 and 21, it will be obvious that it is not necessary for the member 35$^d$ to rotate upon the member 39$^f$ when connecting up to member 32$^d$. For instance, if members 35$^d$ and 39$^f$ should stick together, or even if they were to be made as one piece, rotation relatively to member 32$^d$ would effect clamping. The same is true of the structure shown in Fig. 26.

Figures 27, 28, 29:
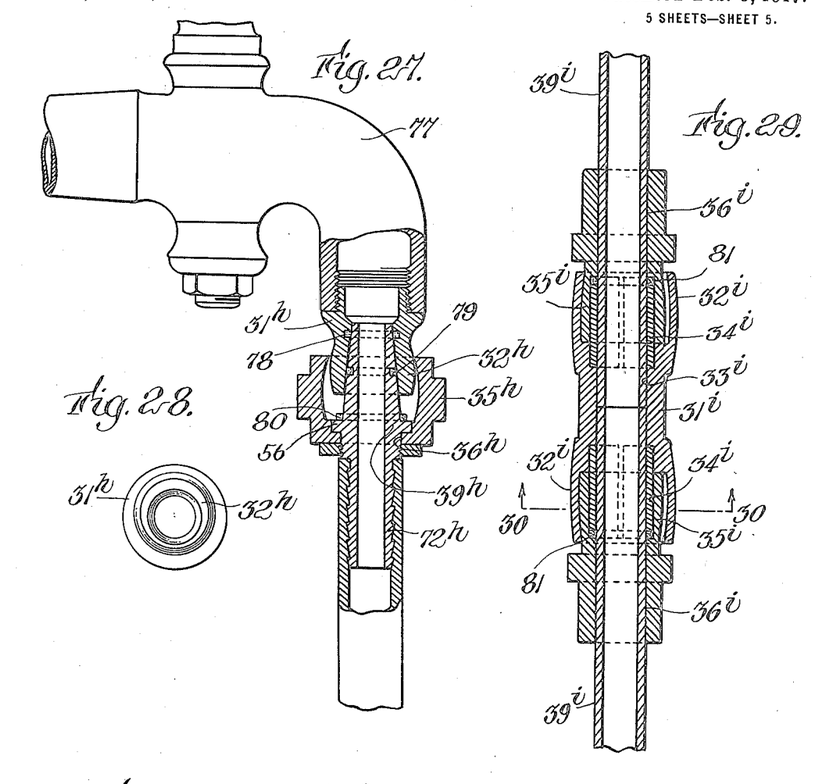
Fig. 27 is a side elevation partly in section of another embodiment.
Fig. 28 is an end view of the male member shown in Fig. 27.
Fig. 29 is a longitudinal section representing another embodiment.

Referring to Fig. 27, which illustrates a form of coupling of this type which is especially adapted for connection to a water or gas conduit, it will be seen that the construction closely resembles that in Figs. 19 and 26. In said Fig. 27 the male member 31$^h$, 32$^h$ has one end screw-threaded to fit a pipe or a faucet 77, the female member 35$^h$ having its inner cylindrical surface 36$^h$ mounted to rotate upon the tubular section 39$^h$, which latter has an extension sleeve or hose nipple 72$^h$ to which a piece of flexible tube can be connected in the same manner as illustrated and described in connection with Fig. 26. Said flexible tube, if the coupling is for use with a water faucet, will be suitable for leading to a shower spray, and if the coupling is used for connection with a gas pipe, then the flexible tube will be of material suitable for a gas extension conduit. In either case it is desirable that there shall be no possibility of leakage. A washer 78 is shown as mounted in an internal annular groove in the member 31$^h$, and a washer 79 is shown as mounted in an external annular groove in the tapering end of section 39$^h$. Although I show two of these washers 77, 78, which are preferably formed of rubber or equivalent material, it is to be understood that I may omit either one or both of such washers.

A washer 80 may be interposed between the flange 56 of the member 39$^h$ and the end of member 32$^h$, either as an addition to the washers 78, 79, or in lieu of either or both of the latter, if the ground joint is insufficient.

Figures 30, 31, 32:
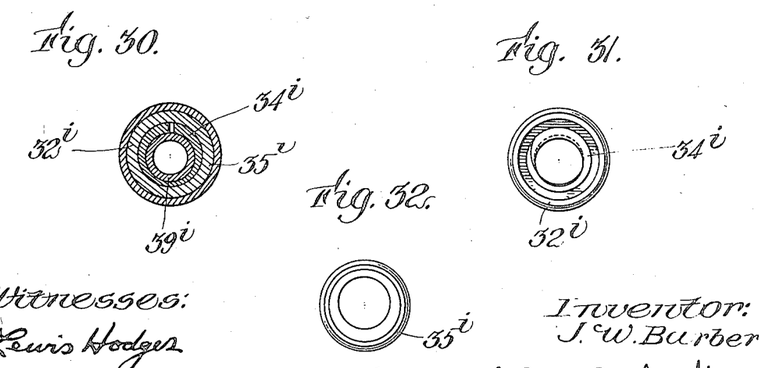
Fig. 30 represents a section on line 30—30 of Fig. 29.
Figs. 31 and 32 are end views of two of the members shown in Fig. 29.

The embodiment of the invention illustrated in Figs. 29 to 32 inclusive is similar to the structures illustrated in Figs. 1 and 11, the chief differences being that in the structure which I shall now proceed to describe the relative arrangement of the interengaging eccentric and cam-faced portions is reversed, and one of the members is divided into two parts, one of which is an eccentric bushing. As shown in Fig. 29, the central member 31$^i$ is formed with a sleeve 32$^i$ at each end, each said sleeve being recessed and internally cam-faced longitudinally, the central portion of the member 31$^i$ having an inner cylindrical surface 33$^i$ which receives the meeting ends of two pipe or rod sections 39$^i$. The end members 35$^i$ have cylindrical surfaces 36$^i$ which engage the pipe or rod sections 39$^i$. Each member 35$^i$ is recessed to receive an eccentric bushing 34$^i$, one end of which latter extends into a recess in the central member 31$^i$. By referring to the bushing 34$^i$ as eccentric, I mean that its outer surface is eccentric to its inner surface. While the inner surface of the bushing fits the pipe or rod 39$^i$, its outer surface at one end engages an inner surface portion of the central member 31$^i$, said bushing at its other end having its outer surface engaging the inner wall of an end member 35$^i$. While the bushing may be continuous, it is preferably divided either radially as indicated in Fig. 30, or so as to have overlapping edges as shown in Fig. 31.

Packing washers 81 may be inserted at either or both ends of the bushings 34$^i$.

When the parts are assembled as shown in Fig. 29, relative rotation of the members 31$^i$ and 35$^i$ causes their inner surfaces to grip upon the bushing 34$^i$, and since the said members 31$^i$ and 35$^i$ have portions which also grip upon the pipe or rod 39$^i$ the relative rotation of the members just described causes them to grip the pipe or rod, the said members 31$^i$ and 35$^i$ being caused to move in an endwise direction toward each other due to the longitudinal cam-faced portions 32$^i$, 35$^i$ in the same manner as hereinafter described in connection with the other structures illustrated. It will now be seen that one difference between the form shown in Fig. 29 and that shown in Figs. 1, 2 or 3, is that in Fig. 29, the ends of the central member extend outside of the end members instead of inside thereof, this being a mere reversal of the positions of said members, and another difference is that in Fig. 29, the bushing 34¹ is a sort of separate lining for the member 35 instead of being integral therewith as shown in the other figures of the drawings.

In some of the figures of the drawings, as Figs. 4 and 27 for instance, the members are shown as partly, but not fully, coupled or drawn together.

Each embodiment illustrated provides an equalizing as well as a threadless coupling which may be quickly applied and which never requires the rotation of either of the two cylindrical pipes or bodies connected by said coupling, and it draws the members of the coupling together to insure a tight joint.

A simple rotation of one member relatively to the other grips the parts together, and such rotation may be either to the right or to the left. If one member comes to halt upon the cylindrical body before the other upon the cylindrical body, it simply remains stationary while the other member is being given sufficient further movement to effect a final grip which is equalized between the members of the coupling.

It is also to be noted that in each embodiment of the invention illustrated the longitudinal distance of movement which is to be imparted to the members when being assembled, is no greater than that usually required when two tubular members are united by screw threads in the ordinary manner. It is to be understood, of course, that in each embodiment illustrated, the diameter of the inner or male member at the longitudinal point where its circumference is the greatest, is sufficiently less than the smallest internal diameter of the outer member to enable the two members to be interengaged or disengaged when longitudinally moved to their proper relative positions. It will also be understood of course that in practice the parts are so proportioned that neither member presents any wall or abutment that would arrest the action of the longitudinally cam-faced portions before completion of the gripping action of the interengaging eccentric portions.

While I have referred to the members 39, with or without reference letter exponents, as cylindrical bodies, tubes or rods, I do not limit myself thereto, as the coupling is adapted to connect, or be connected to, polygonal bodies of various shapes. It is also to be understood that I do not limit myself to the use of the coupling for connecting tubular members such as shown at 60 or 60ᵃ in Figs. 11, 19 and 21, as the members to be connected may be wire cables such as employed for electric conductors. The wires of such cables may be spread at their tips or ends and clamped to the coupling members in a manner similar to the spreading and clamping of the ends of the pipes or hose 60, 60ᵃ.

Having described my invention, I claim:

1. A device of the character described consisting of two members, one having a cone-surfaced portion fitting within a surrounding cone-surfaced portion of the other, each member having a cylindrical bore in substantial alinement, and having the axes of said cone-surfaced portions eccentric to the axes of said cylindrical bores.

2. A coupling consisting of two members, one having a cone-surfaced portion fitting within a surrounding cone-surfaced portion of the other, each member having a cylindrical bore in substantial alinement, and having the axes of said cone-surfaced portions eccentric to the axes of said cylindrical bores, means being provided to prevent relative rotation of the coupling members.

3. A coupling consisting of two members, one having a cone-surfaced portion fitting within a surrounding cone-surfaced portion of the other, each member having a cylindrical bore in substantial alinement, and having the axes of said cone-surfaced portions eccentric to the axes of said cylindrical bores, in combination with a cylindrical member inside the coupling, means being provided to prevent rotation of the coupling members relatively to said cylindrical member.

4. A device of the character described comprising two pipe members and a third member to couple the pipe members together, one pipe member having a conical portion and an annular rib, the second pipe member having an internal face corresponding with said conical portion of the first member and having an external conical face eccentric to the said inner face, the coupling member having a bearing face and a shoulder to coact with the rib of the first mentioned pipe member and having an internal conical face to coact with the external conical face of the second pipe member, the said bearing face being eccentric to the axis of the internal conical face of the coupling member.

5. A device of the character described comprising two pipe members and a third member to couple the pipe members together, one pipe member having a conical portion and an annular rib, the second pipe member having an internal face corresponding with said conical portion of the first member and having an external conical face eccentric to the said inner face, the coupling member having a bearing face and a shoulder to coact with the rib of the first mentioned pipe member and having an internal conical face to coact with the external conical face of the second pipe member, the said bearing face being eccentric to the axis of the internal conical face of the coupling member, means being provided to bear against one end of the coupling member to steady it in its rotative movements.

6. A threadless coupling comprising members one of which has a socket and a conical face surrounding and eccentric to the socket, another member having a socket and a conical face eccentric to the socket and fitting within and coacting with the other conical face, and bodies in alinement within said members, the co-acting faces of said members presenting uninterrupted conical surfaces and being longitudinally cam-faced in opposite directions to draw the members together; the said co-acting faces of the members being frictionally engaged so that relative rotation will cause the binding of the socket walls on said bodies within the coupling members.

In testimony whereof I have affixed my signature, in presence of two witnesses.

JOHN WESLEY BARBER.

Witnesses:
A. W. HARRISON,
CHAS. E. RIORDON.